United States Patent
Wu

(10) Patent No.: US 7,290,325 B2
(45) Date of Patent: Nov. 6, 2007

(54) METHODS OF MANUFACTURING MAGNETIC HEADS WITH REFERENCE AND MONITORING DEVICES

(75) Inventor: Andrew L. Wu, Shrewsbury, MA (US)

(73) Assignee: Quantum Corporation, San Jose, CA (US)

( * ) Notice: Subject to any disclaimer, the term of this patent is extended or adjusted under 35 U.S.C. 154(b) by 311 days.

(21) Appl. No.: 10/917,782

(22) Filed: Aug. 13, 2004

(65) Prior Publication Data

US 2006/0034021 A1    Feb. 16, 2006

(51) Int. Cl.
*G11B 5/127*    (2006.01)
*H04R 31/00*    (2006.01)

(52) U.S. Cl. .............. 29/603.16; 29/603.07; 29/63.12; 29/603.15; 29/603.18; 360/235.7; 360/235.8; 360/236.5; 360/236.6; 360/237; 451/5; 451/41

(58) Field of Classification Search .......... 29/603.07, 29/603.09, 603.12, 603.15, 603.16, 603.18; 360/235.7, 235.8, 236.3, 236.5, 236.6, 237; 451/5, 41

See application file for complete search history.

(56) References Cited

U.S. PATENT DOCUMENTS

| | | |
|---|---|---|
| 4,130,847 A | 12/1978 | Head et al. |
| 5,210,667 A | 5/1993 | Zammit |
| 5,463,805 A | 11/1995 | Mowry et al. |
| 5,544,774 A | 8/1996 | Gray |
| 5,617,273 A | 4/1997 | Carr et al. |
| 5,666,248 A | 9/1997 | Gill |
| 5,710,683 A | 1/1998 | Sundaram |
| 5,772,493 A | 6/1998 | Rottmayer et al. |
| 5,896,253 A | 4/1999 | Dirne et al. |
| 5,991,119 A | 11/1999 | Boutaghou et al. |

(Continued)

FOREIGN PATENT DOCUMENTS

EP    0 497 403 A1    8/1992

(Continued)

OTHER PUBLICATIONS

Bhushan, B. et al. (Apr. 15, 1996), "Pole Tip Recession Studies of Hard Carbon-Coated Thin-Film Tape Heads," *J. Appl. Phys.* 79(8):5916-5918.

(Continued)

*Primary Examiner*—Paul D. Kim
(74) *Attorney, Agent, or Firm*—Morrison & Foerster LLP

(57) ABSTRACT

According to one aspect, an exemplary method for manufacturing a magnetic head includes forming a plurality of magnetoresistive devices, a reference device, and a monitoring device, where the reference device includes a desired stripe height less than the magnetoresistive devices and monitoring device. Material is removed from the air/tape bearing surface, e.g., by lapping, thereby reducing the stripe height of the magnetoresistive devices and monitoring device. A characteristic of the reference device, e.g., resistance, voltage, or the like, is compared with a similar characteristic of the monitoring device, wherein the characteristic of the monitoring device varies as material is removed. Material may be removed from the bearing surface until the characteristic of the monitoring device and the reference device are substantially equal, at which time, the stripe height of the monitoring device and magnetoresistive devices are substantially equal to that of the reference device.

5 Claims, 9 Drawing Sheets

U.S. PATENT DOCUMENTS

| | | |
|---|---|---|
| 6,193,584 B1 | 2/2001 | Rudy et al. |
| 6,205,008 B1 | 3/2001 | Gijs et al. |
| 6,219,205 B1 | 4/2001 | Yuan et al. |
| 6,266,217 B1 | 7/2001 | Ruigrok et al. |
| 6,275,033 B1 | 8/2001 | Kools |
| 6,347,983 B1 | 2/2002 | Hao et al. |
| 6,359,754 B1 | 3/2002 | Riddering et al. |
| 6,381,106 B1 | 4/2002 | Pinarbasi |
| 6,396,670 B1 | 5/2002 | Murdock |
| 6,433,965 B1 | 8/2002 | Gopinathan et al. |
| 6,438,026 B2 | 8/2002 | Gillies et al. |
| 6,669,787 B2 | 12/2003 | Gillies et al. |
| 6,678,126 B2 | 1/2004 | Katakura et al. |
| 6,765,770 B2 | 7/2004 | Dee |
| 7,061,725 B2 * | 6/2006 | Seigler ................. 360/313 |
| 2001/0026470 A1 | 10/2001 | Gillies et al. |
| 2001/0040777 A1 | 11/2001 | Watanabe et al. |
| 2002/0012204 A1 | 1/2002 | Boutaghou et al. |
| 2002/0024780 A1 | 2/2002 | Mao et al. |
| 2002/0034661 A1 | 3/2002 | Gillies et al. |
| 2002/0053129 A1 | 5/2002 | Watanuki |
| 2002/0118493 A1 | 8/2002 | Kondo et al. |
| 2002/0191348 A1 | 12/2002 | Hasegawa et al. |
| 2003/0002230 A1 | 1/2003 | Dee et al. |
| 2003/0002232 A1 | 1/2003 | Dee |
| 2003/0072110 A1 | 4/2003 | Dee |
| 2003/0182789 A1 * | 10/2003 | Kagotani et al. ........ 29/603.14 |
| 2003/0200041 A1 | 10/2003 | Church et al. |
| 2003/0206383 A1 | 11/2003 | Meguro et al. |
| 2003/0235015 A1 | 12/2003 | Wu |
| 2004/0032696 A1 | 2/2004 | Johnson et al. |

FOREIGN PATENT DOCUMENTS

| | | |
|---|---|---|
| EP | 0 498 492 A1 | 8/1992 |
| EP | 0 519 558 A1 | 12/1992 |
| EP | 1 176 585 A2 | 1/2002 |
| EP | 1 376 543 A2 | 1/2004 |
| GB | 2 169 434 A | 7/1986 |
| JP | 62-75924 A | 4/1987 |
| JP | 5-266425 A | 10/1993 |
| JP | 7-153036 A | 6/1995 |
| JP | 7-230610 A | 8/1995 |
| JP | 8-153310 A | 6/1996 |
| JP | 11-120523 A | 4/1999 |
| JP | 2001-291214 A | 10/2001 |

OTHER PUBLICATIONS

Patton, S. T. et al. (1996). "Micromechanical and Tribiological Characterization of Alternate Pole Tip Materials for Magnetic Recording Heads," *Wear* 202(1):99-109.

European Search Report (Extended) mailed Dec. 2, 2005 for European Patent Application No. 05255020.9, seven pages.

* cited by examiner

METHODS OF MANUFACTURING MAGNETIC HEADS WITH REFERENCE AND MONITORING DEVICES

BACKGROUND

1. Field

The present invention relates generally to magnetic read/write heads and methods of manufacture, and more particularly to methods of controlling the stripe height of magnetoresistive devices in magnetic read/write heads.

2. Description of the Related Art

Magnetic storage tape continues to be an efficient and effective medium for data storage in computer systems. Increased data storage capacity and retrieval performance is desired of all commercially viable mass storage devices and media. In the case of linear tape recording, a popular trend is toward multi-head, multi-channel fixed head structures with narrowed recording gaps and data track widths so that many linear data tracks may be achieved on a tape medium of a predetermined width, such as one-half inch width tape. To increase the storage density of magnetic tapes and storage systems, transducer elements, e.g., magnetoresistive (MR) elements or devices, on the head and data tracks on the tape are arranged with greater density.

Magnetic tape heads typically include an active device region including raised strips or ridges, commonly referred to as islands, bumps, or rails, that provide a raised tape support or wear surface across which the magnetic tape advances. One or more of these raised islands includes embedded data transducers. The embedded transducers can be either a recording device for writing information to a magnetic tape or a reproducing device for reading information from a magnetic tape. An embedded recording device produces a magnetic field in the vicinity of a small gap in the core of the device, which causes information to be stored on a magnetic tape as the tape advances across the support surface. In contrast, a reproducing device detects a magnetic field from the surface of a magnetic tape as the tape advances over the support surface. Additionally, raised islands may be included without transducers to help support and guide the magnetic tape over the head, generally referred to as outriggers.

Typically, a plurality of embedded transducers are spaced transversely across a direction of tape transport. The transducers may be sized and disposed along an island for varying storage tape data formats, e.g., different numbers of channels, track widths, and track densities. For example, a four channel head includes four read and four write transducers spaced transversely across a tape path. The width of the read/write transducers and the distance between adjacent read/write transducers is associated with the density of tracks to be written to and read from the storage tape. Storage capacity of magnetic tapes are generally increased with the use of smaller more closely positioned read/write transducers in the tape head.

As the storage tape and tape drive industry evolves and achieves increases in storage capacity, the tape head and media designs continue to make changes from one generation to the next. For instance, new data formats with more densely positioned read/write transducer elements on tape heads, more densely positioned tracks on the storage tape, and thinner storage tape increases the storage capacity of storage tape devices. For example, to increase storage capacity of storage tape, the storage tape may be thinned, e.g., lower magnetization thickness (Mrt), while narrowing and thinning the MR devices in the head.

Typical MR devices for use with magnetic recording heads are manufactured using standard semiconductor type processing methods. For example, multiple rows of magnetic recording transducers are deposited simultaneously on wafer substrates and cut into active device regions for incorporation into a magnetic recording head. After a section of magnetic recording transducers are cut from the wafer, they are subject to a lapping process to reduce the stripe heights of the MR devices to a desired height and smooth or polish the surface of the structure. Stripe height is one of the key parameters that control the signal output and device behavior of a magnetoresistive recording head. The stripe height generally determines the sensitivity of the magnetoresistive device to a magnetic field, where a reduction in stripe height typically produces a more sensitive magnetoresistive device. As magnetic recording density increases, scaled down MR devices, e.g., anisotropic magnetoresistive (AMR) or giant magnetoresistive (GMR) devices, are used to achieve adequate signal output. As MR devices scale down, stripe height scales down accordingly.

The desire for shorter stripe height leads to a desire for tighter control of stripe height during manufacturing, which is generally accomplished by mechanical lapping using one or more Electronic Lapping Guides (ELGs). It is generally unwise to use the actual MR devices for monitoring stripe height because of the potential for electrostatic discharge during the lapping process, which may damage the device. In the manufacture of typical multi-channel tape heads on a wafer, for example, a pair of ELGs is disposed at each end of a cluster of MR devices. The ELGs are monitored during manufacturing to determine the stripe height of the active MR devices of the cluster. For example, the lapping process is controlled to cease when the ELG resistance reaches a calculated value associated with a desired stripe height of the MR devices. The calculated ELG resistance, however, is subjected to variations in the geometry and material thickness of the ELG devices, which may result in large cluster-to-cluster stripe height variations.

It is desired to provide tighter control over stripe height during manufacturing, e.g., to provide smaller stripe heights and more densely configured magnetoresistive devices for recording heads.

BRIEF SUMMARY

In one aspect, a method for manufacturing a magnetic read/write head is provided. In one example, the method includes forming a plurality of magnetoresistive devices, a reference device, and a monitoring device, where the reference device includes a stripe height less than the plurality of magnetoresistive devices and monitoring device. Material is removed from an air bearing or tape bearing surface, e.g., by lapping, thereby reducing the stripe height of the magnetoresistive devices and monitoring device. A characteristic of the reference device, e.g., resistance, voltage, or the like, is compared with a characteristic of the monitoring device, wherein the characteristic of the monitoring device varies as material is removed from the surface. Material may be removed from the surface until the characteristic of the monitoring device and the reference device are substantially equal, at which time, the stripe height of the monitoring device and magnetoresistive devices are substantially equal to that of the reference device.

The reference device may be formed with a desired stripe height of the magnetoresistive devices and serve as a proxy for the stripe height of the magnetoresistive devices. The reference device and monitoring device may be formed on the same level and through the same processing steps as readers of the magnetoresistive devices, thereby reducing differences with different processing levels and steps. The reference device and monitoring device may be placed adjacent the plurality of magnetoresistive devices to further enhance control over stripe height. Further, a set of devices including a reference device and monitoring device may be included on opposite sides of each cluster of magnetoresistive devices to reduce device-to-device variations across a cluster.

In another example, a method for manufacturing a magnetic head includes forming a plurality of magnetoresistive devices, a reference device, and a monitoring device on a substrate, wherein the magnetoresistive devices and the monitoring device are formed in the same manner, and the reference device is formed having a stripe height less than the magnetoresistive devices. The method further includes measuring an electrical characteristic of the reference device and an electrical characteristic of the monitoring device, and lapping a surface of the substrate including the magnetoresistive devices, the monitoring device, and the reference device until the electrical characteristic of the reference device and the electrical characteristic of the monitoring device are equal or within desired tolerances.

According to another aspect, a magnetic recording head is provided. In one example the magnetic recording head includes a plurality of magnetoresistive devices, and a pair of electronic lapping guides including a monitoring device and a reference device, wherein the monitoring device and the reference device are used during a lapping process to determine the relative height of the reference device to the monitoring device.

Various aspects and examples are better understood upon consideration of the detailed description below in conjunction with the accompanying drawings and claims.

DETAILED DESCRIPTION

Figure 1:
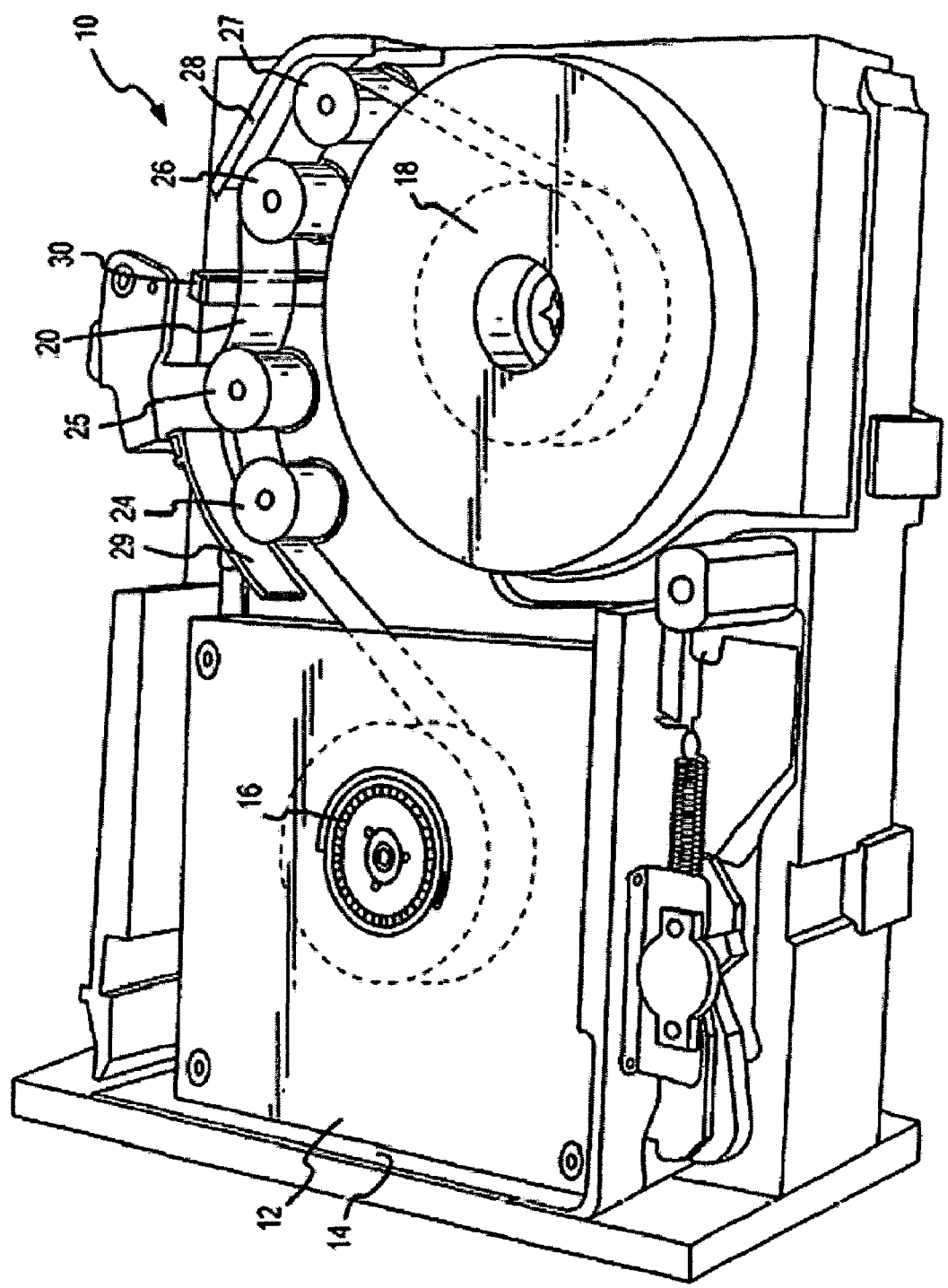
FIG. 1 illustrates an exemplary tape drive system.

Exemplary methods for manufacturing magnetic recording heads using a reference device and a monitoring device are provided. The following description is presented to enable any person of ordinary skill in the art to make and use the exemplary methods and associated devices. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention and its various aspects are not intended to be limited to the examples described and shown, but is to be accorded the scope consistent with the appended claims.

Scaled down MR devices or elements, e.g., AMR or GMR devices, are desired for higher magnetic recording density. As MR devices scale down, the stripe height of the MR devices is scaled down accordingly. Conventional stripe height control using mechanical lapping and calculated ELG resistance to stop lapping often results in cluster-to-cluster stripe height variations. Accordingly, exemplary methods described herein may provide improved control over the stripe height of MR devices, thereby allowing, for example, for the manufacture of smaller, more densely positioned MR devices.

One exemplary manufacturing method for achieving improved stripe height control in multi-channel magnetic read/write heads includes manufacturing MR devices using a reference device and monitoring device. The reference device is formed with a target stripe height desired for the MR devices, and the monitoring device is formed similarly to the MR devices (e.g., similar to a read element of an active MR device). The monitoring device is monitored during manufacturing, e.g., during a lapping or polishing step, until resistance of the monitoring device equals the resistance of the reference device.

In one example, the stripe height of the reference device is determined by wafer processing, e.g., photolithographic wafer processes. The reference device may be precisely manufactured with desired stripe height characteristics using typical wafer processing techniques such that a desired stripe height of the MR devices, e.g., read and/or write elements, may be achieved by measuring the reference device and monitoring device. In one example, the reference device and monitoring device are manufactured in the same manner, e.g., same processing level and steps, as the read elements of the active MR devices, which may reduce variations between the active MR devices and the reference and monitoring devices. Additionally, in one example, the reference device and monitoring device are formed adjacent the MR devices to reduce stripe height variations among them.

The following discussion describes examples as being particularly useful as part of a linear tape drive system utilizing magnetoresistive tape heads for performing read and write operations on magnetic storage media (such as magnetic particle tape). It will be understood, however, that the various examples may be useful with other magnetic storage media and devices such as hard disks, floppy disks, and the like. Accordingly, the exemplary manufacturing methods and devices may be directed to and utilized in various magnetic storage systems.

FIG. 1 illustrates a cut-a-way view of an exemplary magnetic tape drive 10 in which exemplary tape heads as described herein may be used. The particular arrangement of tape drive 10 is provided for completeness of the operating environment for exemplary tape heads and to facilitate description of how exemplary tape heads may be utilized during operation of a tape drive. Tape drive 10 includes a tape cartridge 12 inserted into a receiver 14. Tape drive 10 includes a motor (not shown) which drives a cartridge supply reel 16 and moves tape 20 at a particular speed (e.g., 120 inches per second or more). Tape drive 10 may also include a second motor (not shown) which drives a take-up reel 18. Tape 20 may be driven in either a forward direction or a reverse direction to write data onto or read data from the tape as controlled by a motor controller circuit (not shown in FIG. 1, but typically provided on one or more printed circuit boards). The controller may also be adapted for controlling magnitudes of read/write currents passed through head 30, e.g., to select particular read/write elements for particular data formats and data tracks. Tape 20 is guided through tape drive 10 by a plurality of tape guide assemblies 24-29 between the take-up reel 18 and the cartridge 12 and past tape head 30.

Figure 2:
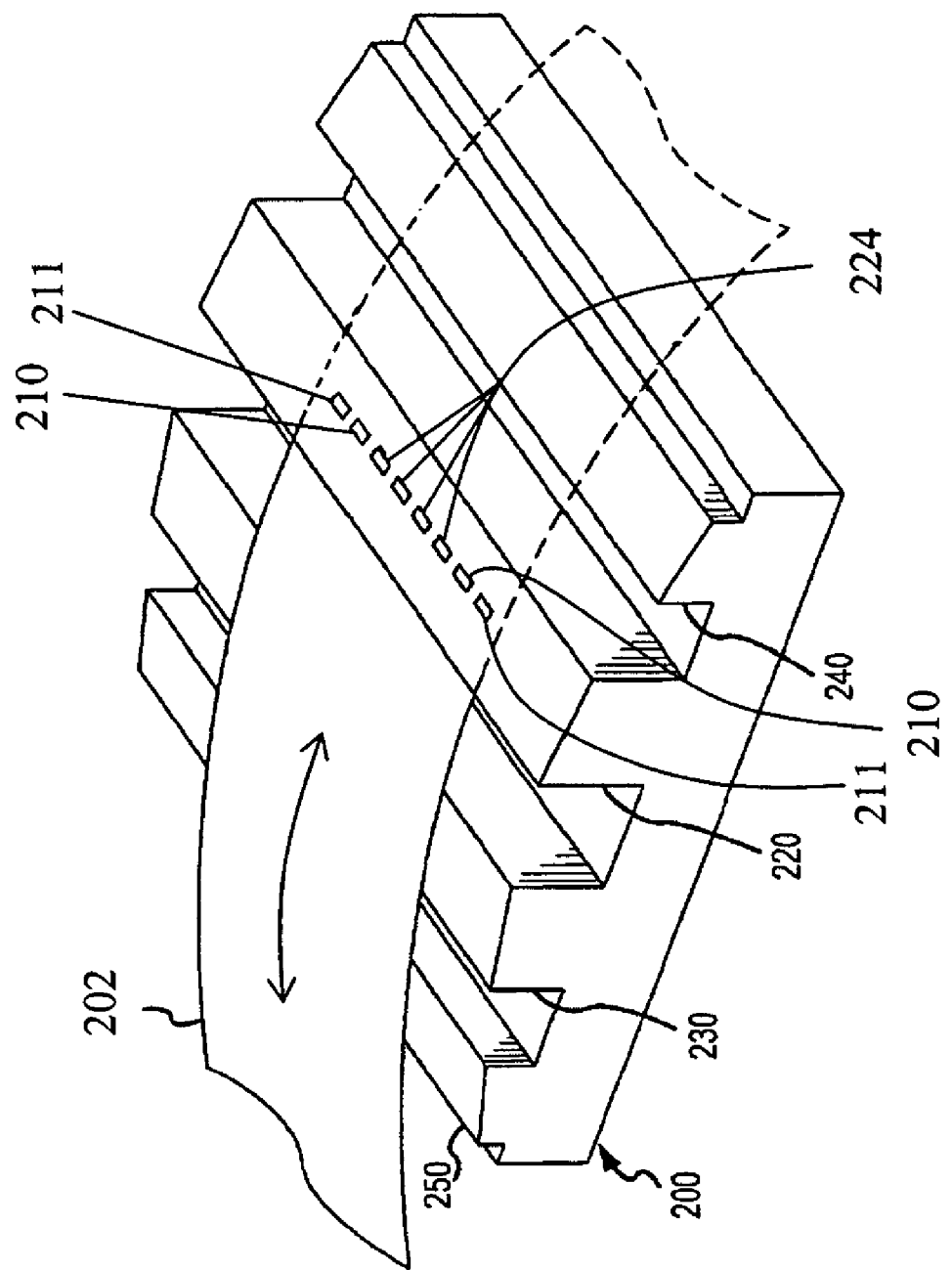
FIG. 2 illustrates an exemplary magnetic recording head.

FIG. 2 illustrates a perspective view of an exemplary tape head 200 including raised elongated bumps or islands 220, 230, 240, and 250, which may be used in a digital linear tape drive similar to drive 10 of FIG. 1. Included along raised islands 220 and 230 are data transducers or read/write elements 224 (shown only along island 220) arranged transversely to the direction of tape transport to enable reading from and writing to tape 202. Additionally, a monitoring device 210 and reference device 211 are included adjacent read/write element 224, which were used during manufacturing tape head 200 as described herein. As shown, tape head 200 is adapted for contacting media, such as magnetic particle tape 202 that typically has a width ranging from 5 to 20 millimeters.

The fabrication of exemplary tape heads having magnetoresistive elements and including (and/or manufactured with) ELGs may be manufactured utilizing any of a number of suitable wafer/semiconductor processing techniques previously developed and well known in the art. For example, thin-film heads, such as head 200 shown in FIG. 2, are fabricated in clean rooms using vacuum or physical vapor deposition methods (such as RF or DC magnetron sputtering, RF or DC diode sputtering, RF or DC triode sputtering) and ion beam deposition, batch photolithographic methods (such as photoresist masking, coating, and developing), chemical assisted and reactive ion-beam etching, photoresist stripping and etching that allow for very small head and element dimensions and precise positioning and alignment of multiple transducer elements (such as elements 224). The slots or separation of the islands 220 and 240 can be achieved using laser trimming, precision grinding, or other machining techniques. Each island, such as island 220 or 240, may be fabricated by encapsulating layers of materials within two or more substrate materials followed by lapping or fine polishing to achieve a desired media contact contour and surface. Alternatively, each island may be fabricated of several segments or portions that are then epoxy-bonded together to create the elongated islands. The media contact surface may be coated with a corrosion or wear resistant thin layer to protect the read/write elements.

The resulting active island generally includes the read/write elements and is made of thin layers of different materials (such as metal alloys and insulating materials). The tape head may be configured to be a thinfilm inductive head, a thinfilm AMR head, a dual MR head, an integrated thinfilm inductive write and MR or GMR read head, or other thinfilm head design. Additionally, inactive islands or outriggers may be fabricated in a similar fashion to the active islands using similar materials or using different materials. Alternatively, inactive islands may be bonded to the head and formed in differing thinfilm processes.

The number of thinfilm layers utilized in the read/write elements and the make-up of each layer may be varied depending on the particular application and design considerations. For example, the read/write elements may be fabricated with insulating layers (such as alumina) and top and bottom layers or magnetic poles of cobalt-zirconium-tantalum (CZT), which is commonly used in thinfilm heads and for which, manufacturing processes are well understood by those of ordinary skill in the arts. Poles and shields fabricated using at least one of cobalt, nickel, and iron are also useful for fabricating read/write elements. The base substrate upon which the read/write elements are built may be ferrite, aluminum oxide titanium carbide (AlTiC) or other materials. The specific materials or fabrication processes use to manufacture exemplary heads as described herein are not limited to any specific materials or fabrication processes.

Figure 3A:
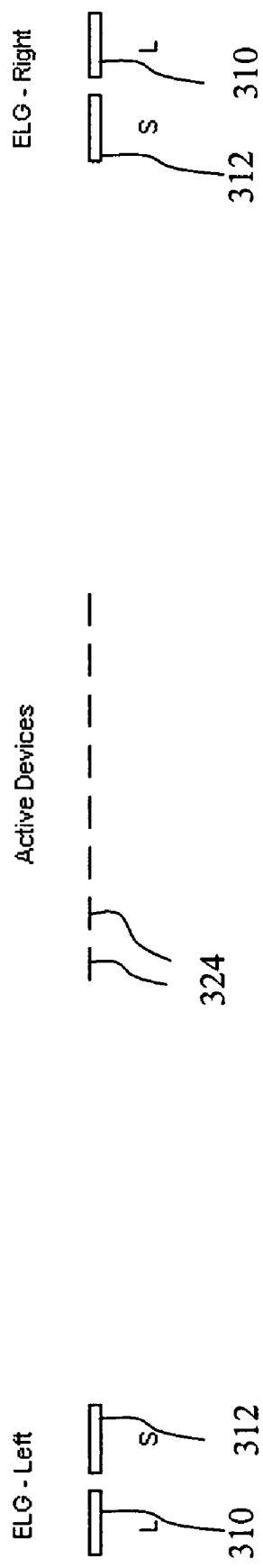
FIGS. 3A and 3B illustrate an exemplary configuration of MR devices and ELGs.
Figure 3B:
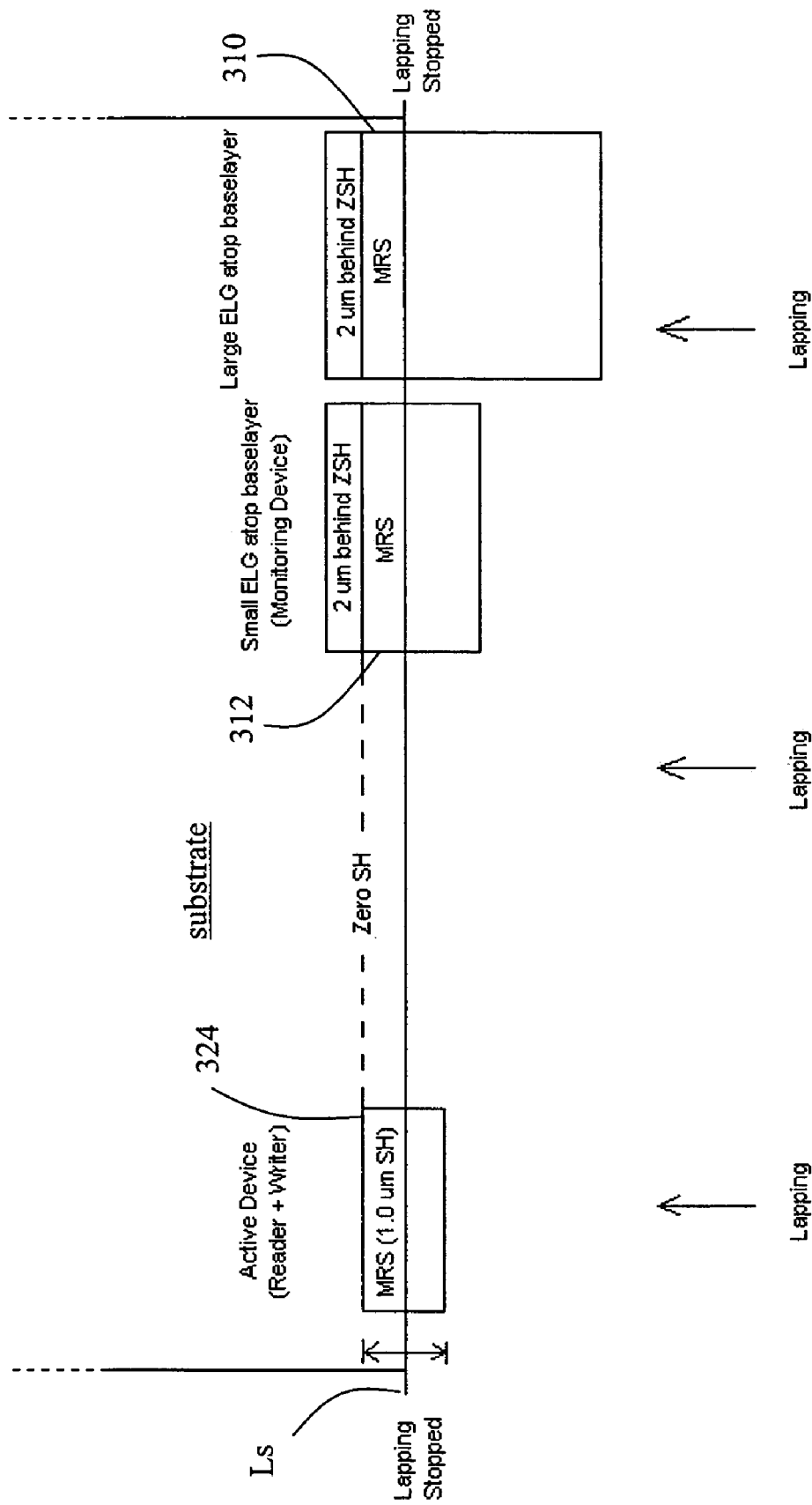

FIGS. 3A and 3B illustrate top views of a conventional configuration of ELGs 310, 312, and active MR devices 324 formed on a surface of a suitable substrate. The design includes two pairs of ELGs, each pair including a large ELG 310 and a small ELG 312. The distance between active devices 324 and ELGs 310 and 312 is not to scale and active devices 324 are typically separated from ELGs 310 and 312 by a distance ranging from 1 mm to 3.5 mm depending, for example, on the number of channels in the tape head. It will be understood that the figures include exemplary dimensions of active devices and ELGs and these dimensions are illustrative only.

Initially, the large ELGs 310, small ELGs 312, and MR devices 324 have a stripe height larger than desired, as shown in FIG. 3B, extending from above or behind the zero stripe height line ("zero SH") corresponding to the active device 324 downward. One or more lapping procedures are performed to wear down active devices 324 and remove material from the bearing surface (e.g., an air bearing surface ("ABS") as referred to with respect to disk drive heads, or the tape bearing surface ("TBS") as referred to with respect to tape drive heads), thereby reducing the stripe height to a desired stripe height, e.g., shown here as line Ls.

Generally, large ELGs 310 are used to balance the initial lapping (or rough lapping) of the structure to level the surface for subsequent lapping processes. Small ELGs 312 are then used as monitoring devices in the final lapping (or polishing) to reduce the stripe height of MR device 324 to a desired stripe height, for example, 1.0 µm or less. In particular, the resistance of small ELGs 312 are monitored and compared to predetermined or calculated ELG resistance values to determine sufficient lapping, i.e., when to stop the lapping process for a particular stripe height of MR devices 324.

As described above, however, relying on calculated ELG resistance values may lead to variation across different clusters. The variance becomes increasingly problematic as the desired stripe heights decrease. Further, each ELG 310, 312 is generally disposed atop a baselayer, whereas the active devices are built atop CZT bottom shield and read gap. Forming active devices 324 and ELGs 310, 312 on different levels may result in different critical dimensions due to the nature of optical imaging (e.g., different depths of focus over varying layers during photoresist processes may result in different critical dimensions).

Figure 4A:
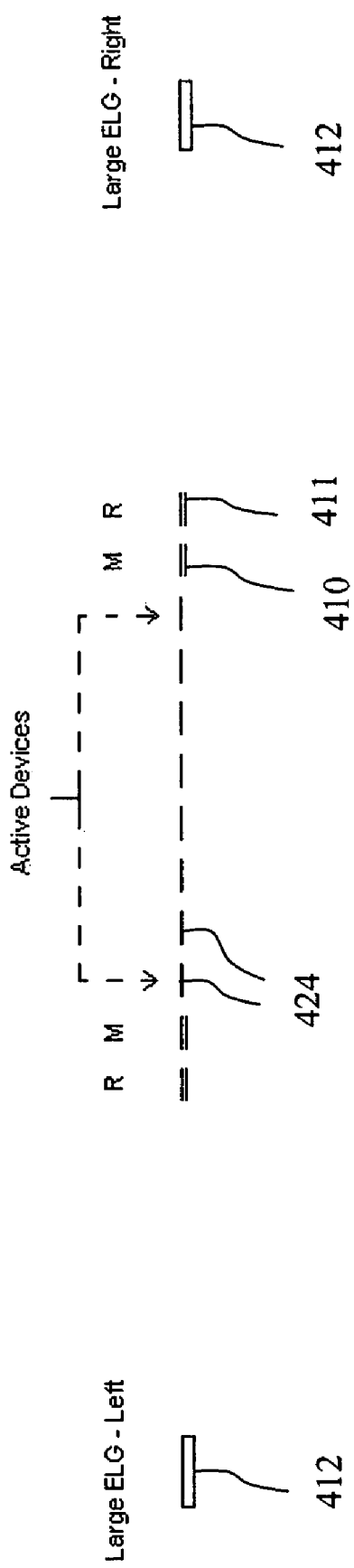
FIGS. 4A-4C illustrate an exemplary configuration of MR devices and ELGs (including a monitoring device and reference device)
Figure 4B:
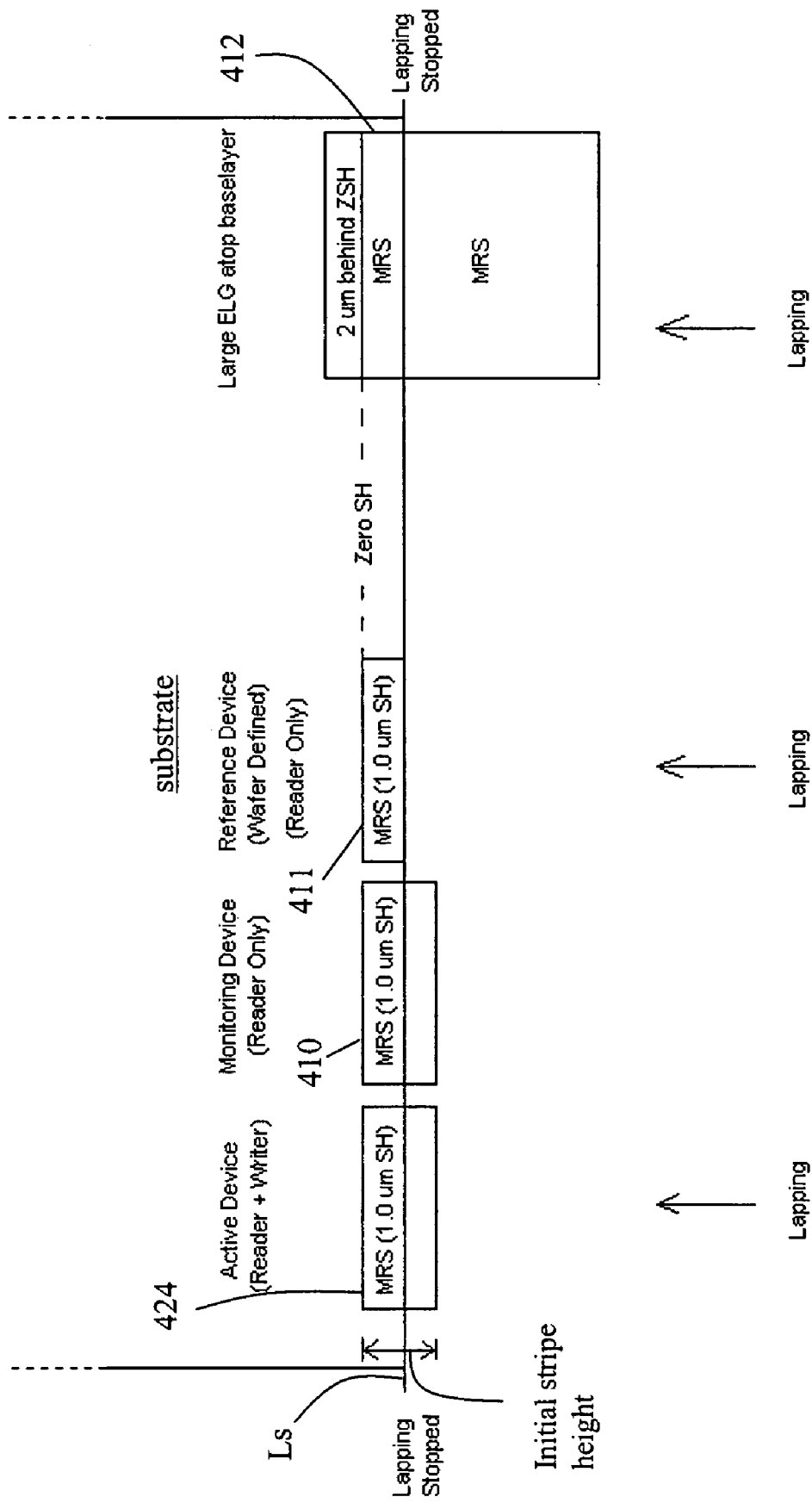

FIGS. 4A and 4B illustrate top views of an exemplary configuration of active MR devices 424 and ELGs 410, 411, and 412. In this example, the ELGs include at least one pair of devices, a monitoring device 410 and reference device 411, located adjacent active devices 424. Additionally, large ELG 412 may be included and located at both ends of the cluster of active devices 424 to level and smooth the surface in a rough polishing process similar to the conventional configuration described.

In one example, reference device 411 and monitoring device 410 are produced by photolithographic wafer processing similar to active devices 424. In particular, reference device 411 and monitoring device 410 are formed to have the same structure as active readers except for the wafer defined stripe height of reference device 411. For example, reference device 411 and monitoring device 410 may be formed on the same level and with the same process steps as readers of active devices 424, thereby reducing or eliminating the critical dimension differences associated with different levels. Further, reference device 411 and monitoring device 410 may be disposed adjacent each end of the active device area, for example, at a pitch similar to active devices 424. Reference device 411 is formed to have a stripe height equal to that desired or targeted of active devices 424. In this particular example, a stripe height of 1.0 µm is shown for illustrative purposes only. Monitoring device 410 is formed similarly or identically to active devices 424 and includes an initial stripe height greater than reference device 411 (in this example greater than 1.0 µm, and similar to the initial stripe height of active devices 424). Accordingly, monitoring device 410 behaves similarly to an active reader during lapping processes. Measurements of monitoring device 410 and reference device 411 may be compared to determine relative stripe heights, where the height of reference device 411 should approximate the stripe height of active devices 424. Accordingly, monitoring device 410 may be monitored during lapping and stopped using the wafer-defined reference device 411.

Figure 4C:
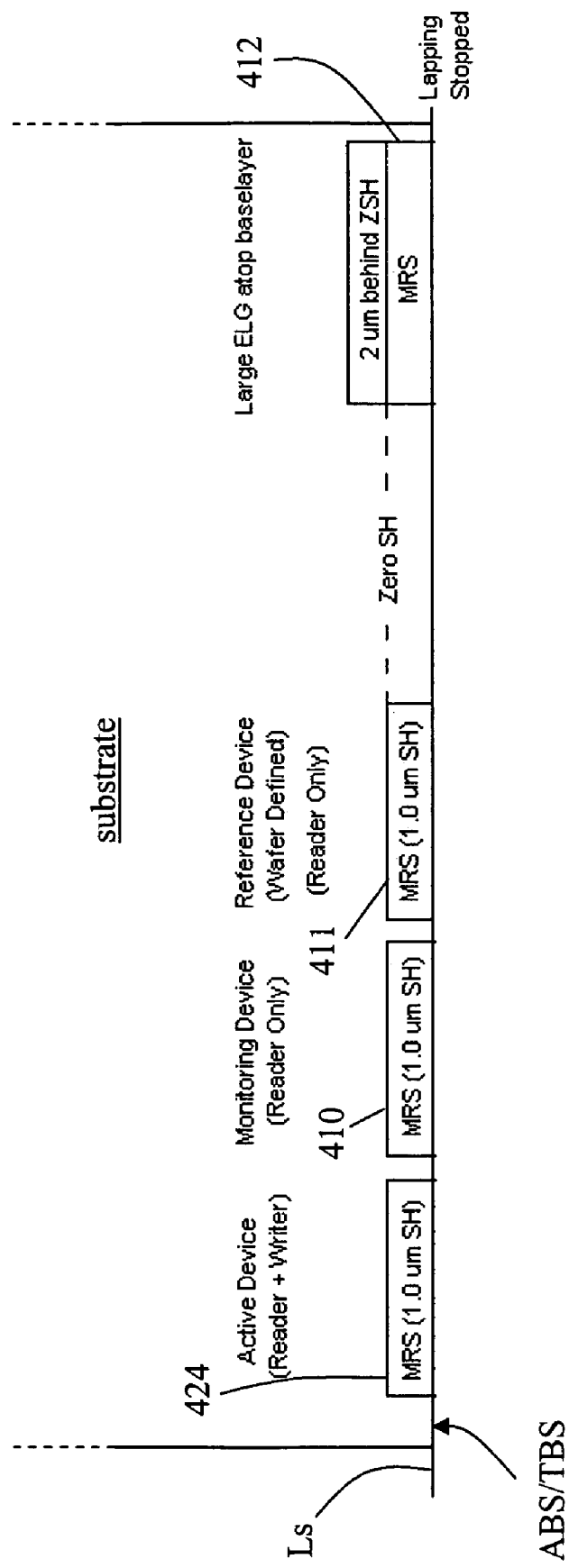

In one exemplary lapping process using the configuration shown in FIGS. 4A and 4B, initial lapping of the ABS/TBS is performed using large ELGs 412 to balance the surface and reduce large scale roughness. Thereafter, the lapping process is continued while monitoring an electrical characteristic of reference device 411 and monitoring device 410, for example, monitoring the resistance of each device 410 and 411. Removal of material from the ABS/TBS is ceased when the stripe height of monitoring device 410 reaches a similar or identical height as reference device 411, as indicated by the measured electrical characteristic. For example, when resistance measurements of reference device 411 and monitoring device 410 are equal or within desired tolerances, removal of the surface should be stopped. In some examples, stripe heights may be lapped to within 0.05 µm using a monitoring device 410 and reference device 411 as shown in FIGS. 4A-4C (in contrast with about 0.2 µm with ELGs 310 and 312 of FIGS. 3A and 3B, for example). In some examples, additional polishing or conditioning of the surface, which has little or no effect on stripe heights, may be performed.

Reference device 411 is formed with a targeted stripe heights pre-defined by the wafer processing. For illustrative purposes only, a targeted 1 um stripe height is shown in FIG. 4B. In one example, the reference devices 411 and monitoring devices 410 are built the same manner and at the same time as the readers of active devices 424, e.g., using suitable wafer processing methods known in the art. Accordingly, reference device 411 and monitoring device 410 provide an effective guide for achieving desired stripe heights with reduced tolerances over conventional methods. Additionally, the proximity of reference device 411 and monitoring device 410 to active devices 424 may increase the accuracy and control of the stripe heights. For examples, exemplary guides such as reference device 411 and monitoring device 410 have been shown to provide better than two times improvement in cluster-to-cluster stripe height control of active devices 424.

FIG. 4C illustrates the exemplary head after lapping active devices 424 to a stripe height equal to reference device 411. The cluster of active devices 424 may be cut from the substrate and incorporated into a head structure similar to FIG. 2, for example. In one example, monitoring device 410 and reference device 411 remain with active devices 424 after bar cut. In other examples, reference device 411 and/or monitoring device 410 may be cut from the active device region after processing.

In one example, the trackwidth of monitoring device 410 and reference device 411 are equal to or greater than the active readers of active devices 424. This feature may minimize the impact of gauging capability of instruments used in measuring electrical characteristics of the monitoring device 410 and reference device 411. Readers of active devices 424 generally have relatively narrow read trackwidths which often result in low MR resistance values. For example, gauging sensitivity may by improved utilizing a 100 ohm resistor versus a 20 ohm resistor.

It is noted that various other configurations of reference devices and monitoring devices may be utilized to improve device-to-device stripe height uniformity. For example, any number of reference devices and monitoring devices may be used for each cluster of active devices. The reference and monitoring devices may be disposed or intermixed within the active devices. Further, a greater number of monitoring devices could be used than reference devices, or vice versa.

Figure 5:
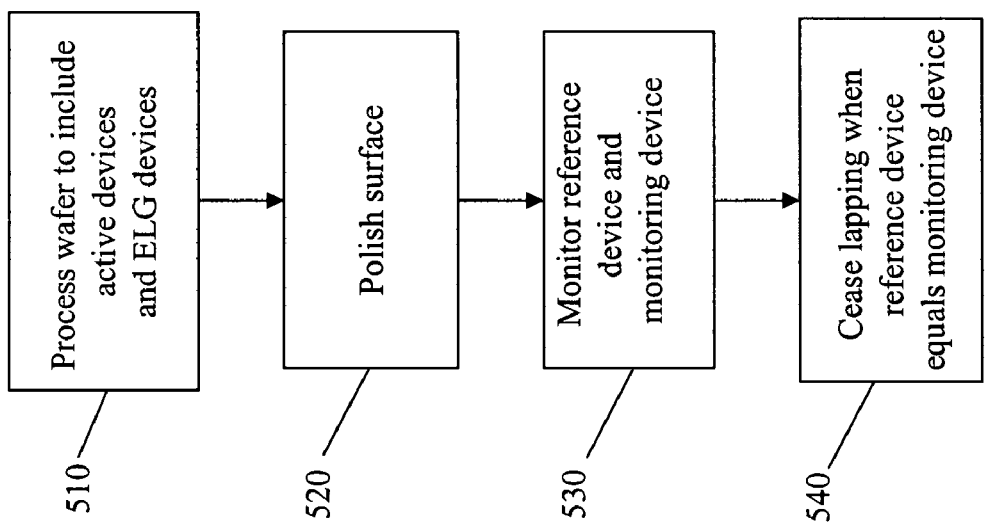
FIG. 5 illustrates an exemplary method for manufacturing a magnetic recoding head including a monitoring device and reference device.

FIG. 5 illustrates an exemplary lapping method using a reference device and monitoring device as described herein, e.g., as shown in FIGS. 4A and 4B. In block 510 a wafer is processed to form active devices, e.g., read/write MR devices arranged in one or more clusters as described. Further, at least one pair of ELG devices including a monitoring device and reference device is formed. Additionally, the wafer may be processed to include conventional ELGs, e.g., such as large and/or small ELGs as described above. The wafer may be manufactured by any suitable wafer processing methods known in the art.

In block 520, the wafer is polished to remove material from the ABS/TBS of the substrate including the active devices and monitoring device(s). A polishing process is performed, e.g., a lapping process or the like, to remove material from the ABS/TBS and grind the active devices to a desired stripe height as described below. In one example, several polishing steps may be used, e.g., a rough polish while monitoring conventional large and/or small ELGs, if present, followed by a fine or smooth polishing to reach a desired stripe height.

In block 530, the reference device and monitoring device are monitored intermittently or continuously during the one or more polishing steps of block 520. In particular, an electrical characteristic, e.g., the resistance, voltage, or the like, of the reference device and monitoring device are measured and compared. In one example, a test signal is sent through the reference and monitoring device to determine the relative stripe heights. Material is removed from the ABS/TBS of the substrate until the measured values from the reference device and monitoring device are substantial equal, e.g., until the measured values indicate the stripe heights are equal or within desired tolerances. When the values are substantially equal, the polishing is ceased in block 540 thereby reducing the stripe height of the active devices to a desired height predetermined by the reference device.

Figure 6:
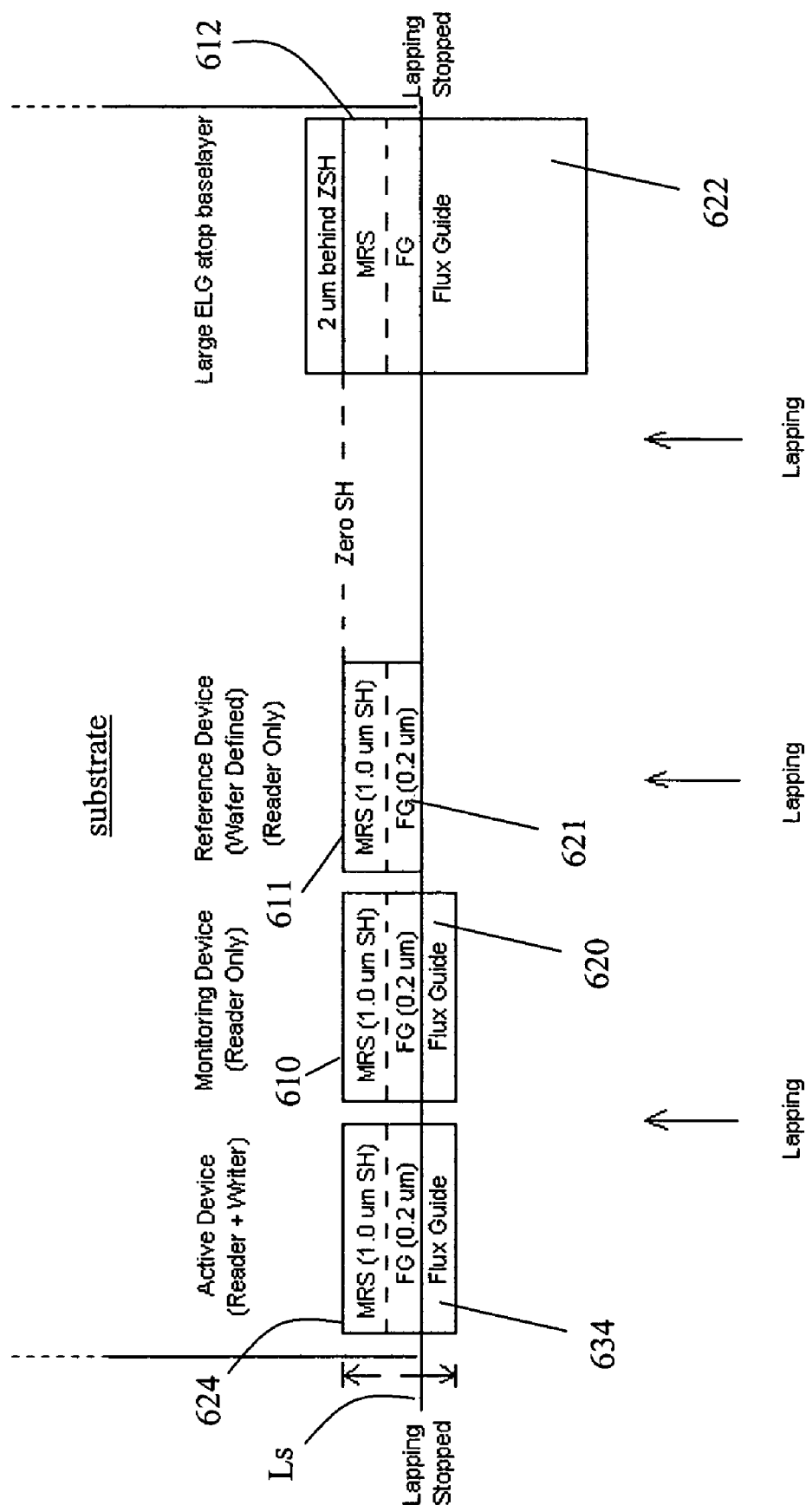
FIG. 6 illustrates another exemplary configuration of MR devices and ELGs (including a monitoring device and a reference device).

FIG. 6 illustrates a top view of another exemplary configuration of active devices 624 and dual ELGs having a monitoring device 610 and reference device 611. In this instance, particularly suitable for use in a GMR magnetic head, for example, front flux guides 634, 620, 621, and 622 are used with active device 624, monitoring device 610, reference device 611, and large ELG 612 respectively. Again, devices containing the wafer defined stripe height and flux guide (in this illustrative example, 1.0 µm and 0.2

μm respectively) are used as references to stop lapping and define the final stripe height of active devices 624. Monitoring device 610 and reference device 611 are used in a similar fashion as described above to polish the surface of the substrate and control the stripe height of active devices 624.

The above detailed description is provided to illustrate various examples and is not intended to be limiting. It will be apparent to those skilled in the art that numerous modification and variations within the scope of the present invention are possible. For example, various configurations of active devices and combinations of reference and monitoring devices may be used. Further, numerous other materials and processes not explicitly described herein may be used within the scope of the exemplary methods and structures described as will be recognized by those of ordinary skill in the art. Additionally, throughout this description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A method for manufacturing a magnetic head, comprising, forming a plurality of magnetoresistive devices and an electronic lapping guide, the electronic lapping guide including a reference device and a monitoring device, wherein the magnetoresistive devices, the reference device, and the monitoring device are formed in the same manner, and the reference device is formed having a stripe height less than the magnetoresistive devices;

measuring an electrical characteristic of the reference device and an electrical characteristic of the monitoring device; and lapping a bearing surface including the magnetoresistive devices, the monitoring device, and the reference device until the electrical characteristic of the reference device and the electrical characteristic of the monitoring device are substantially equal.

2. The method of claim 1, wherein the reference device is formed having a stripe height defined by a photolithographic process.

3. The method of claim 1, wherein the monitoring device and the reference device are formed adjacent the magnetoresistive devices.

4. The method of claim 1, further comprising sending at least one electrical signal through the reference device and the monitoring device to determine the electrical characteristic of the reference device and the electrical characteristic of the monitoring device.

5. The method of claim 1, wherein the magnetoresistive devices include anisotropic magnetoresistive devices or giant magnetoresistive devices.

* * * * *